United States Patent [19]
King

[11] 3,826,041
[45] July 30, 1974

[54] FLORAL ACCESSORY
[76] Inventor: James M. King, 10515 Tabor St., Los Angeles, Calif. 90034
[22] Filed: July 20, 1973
[21] Appl. No.: 381,216

Related U.S. Application Data
[63] Continuation of Ser. No. 156,879, June 25, 1971, abandoned.

[52] U.S. Cl. ............................................. 47/41.12
[51] Int. Cl. .............................................. A07g 5/00
[58] Field of Search ......................... 47/41.12, 41.4

[56] References Cited
UNITED STATES PATENTS
| 1,887,139 | 11/1932 | Richardson | 47/41.12 X |
| 2,904,933 | 9/1959 | King | 47/41.12 |
| 2,922,254 | 1/1960 | Smithers | 47/41.12 |
| 2,994,985 | 8/1961 | Jackson | 47/41.12 |
| 3,201,900 | 8/1965 | King | 47/41.12 |

FOREIGN PATENTS OR APPLICATIONS
| 448,931 | 6/1953 | Canada | 47/41.4 |
| 1,188,643 | 4/1970 | Great Britain | 47/41.12 |
| 1,169,196 | 10/1969 | Great Britain | 47/41.12 |

Primary Examiner—Robert E. Pulfrey
Assistant Examiner—Edward M. Coven
Attorney, Agent, or Firm—John D. Pope, III

[57] ABSTRACT

A floral accessory having a water absorbent filler material disposed in a relatively non-absorbent container. Both the container and filler material are capable of being pierced by the stems of cut flowers. Confronting surface portions of the filler and container are configured to define a collar-like channel around the filler, such that insertion of the stem into the filler is unobstructed by any container material.

9 Claims, 6 Drawing Figures

INVENTOR
JAMES M. KING
BY John D. Pope III
ATTORNEY

INVENTOR
JAMES M. KING
BY John D. Pojo III
ATTORNEY

FLORAL ACCESSORY

This is a continuation of application Ser. No. 156,879, filed June 25, 1971 now abandoned.

This invention is directed to new and useful improvements in florist's accessories and more particularly to a floral accessory for use in preparing portable floral displays.

Certain floral accessories are used to support flowers by inserting the flower stems therein an any number of various predetermined or undetermined arrangements. Known floral accessories such as disclosed in my U.S. Pat. Nos. 2,904,933 and 3,201,900 include a water absorbent filler packaged in a container formed of relatively non-absorbent material.

In preparing a floral display using such known accessories flower stems are inserted through the container walls and into the filler, which insertion determines the display position of the flower. Ideally, the inserted flower stem is tightly supported by both the container wall and the filler. However, I have found that when the floral accessory includes a filler that is formed of any one of various known foam-like materials generally used in floral accessories the force necessary to insert a flower stem through the container wall and into the filler often causes the flower stem to buckle. A known way of obviating this buckling problem is to preperforate the accessory with a sharpened peg made of wood or any other suitable material. The flower stem is then inserted into the preformed perforation.

Even using this method of preperforating a floral accessory I have found that the stems are usually not firmly held in the filler. Thus the practice of preperforating a floral accessory is not only time consuming but also does not insure that the flower stem will be tightly held in the filler material.

In experimenting with floral accessories of the type described I have found that a plug of container material is formed as a flower stem or peg penetrates the container wall of the floral accessory. This plug of container wall material is forced by the peg or flower stem into the softer filler material, shielding and essentially blunting the end thereof. Consequently as the stem or peg is inserted into the filler material the plug is also driven therein. If the stem were inserted directly into the container wall of the accessory, which is relatively harder and more rigid than the filler material, without first preperforating the accessory with a peg, the resistance of the foam filler material to the plug would generally cause the stem to buckle or break. Further a directly inserted stem encounters increasing resistance as the depth of penetration into the filler increases. This resistance to stem penetration, due to movement of the plug with the stem, tends to crush and destroy the end of the cambium layer which contains the principal water transpiring system of many flowers. I have also found that the plug is somewhat conical in shape having a base area that is usually greater than the cross-section of the stem. Thus as the stem or peg pushes the plug forwardly into the filler the hole formed in the filler material by the plug is larger than the stem or peg diameter. Consequently the filler will not hug and firmly support the stem.

Among the several objects of the present invention may be noted the provision of a novel floral accessory; a novel floral accessory having provision for preventing a plug of container material from entering the filler material; a novel floral accessory wherein the filler material securely holds a flower stem; a novel floral accessory having a plug clearing channel between the container and filler material; a novel floral accessory having a filler spaced from the walls of the container, yet firmly disposed therein; and a novel method for making a floral accessory. Other objects and features will be in part apparent and in part pointed out hereinafter.

The present invention relates to a novel floral accessory for supporting a decorative arrangement of flowers. In one embodiment of the invention the accessory comprises a frangible open container formed of a rigid multicellular closed cell material having substantially no water absorbing capabilities. A water absorbent foam-like filler material capable of being pierced by the stems of cut flowers to form a supporting bed therefor is disposed internally of the container. The confronting surfaces of the filler and container are configured to define a channel-like space therebetween. Upon insertion of a flower stem into the floral accessory, the plug that is formed as the stem penetrates the container wall is displaced into the channel. The spacing of the channel permits the plug to either pivot away from the stem or drop into the channel. Thus the stem can be inserted into the filler without the plug.

The invention accordingly comprises the constructions and methods hereinafter described, the scope of the invention being indicated in the following claims.

In the accompanying drawings, in which one of various possible embodiments of the invention is illustrated, FIG. 1 is a top plan view of a floral accessory which incorporates one embodiment of the present invention;

Corresponding reference characters indicate corresponding parts throughout the several views of the drawings.

Figure 1:
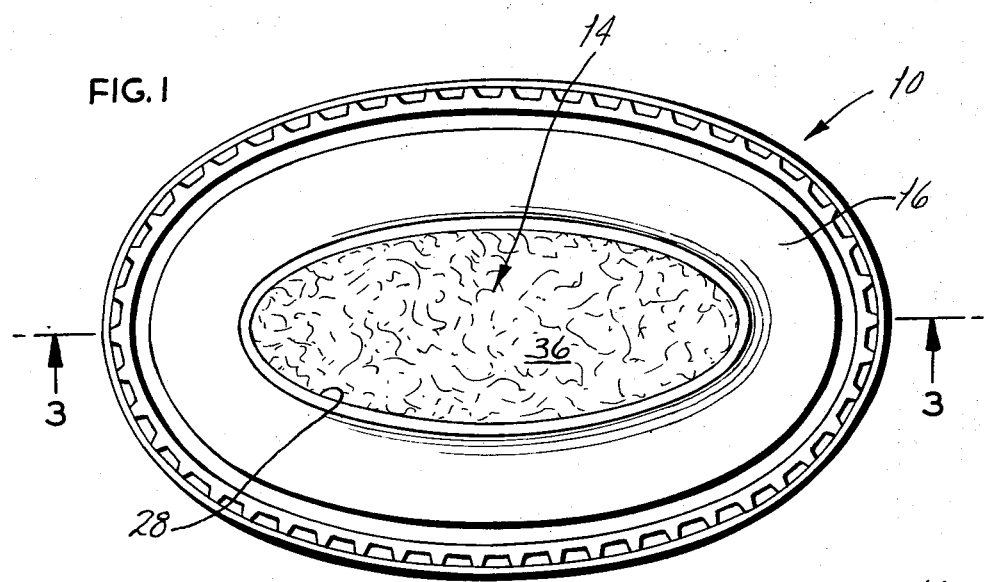
Figure 2:
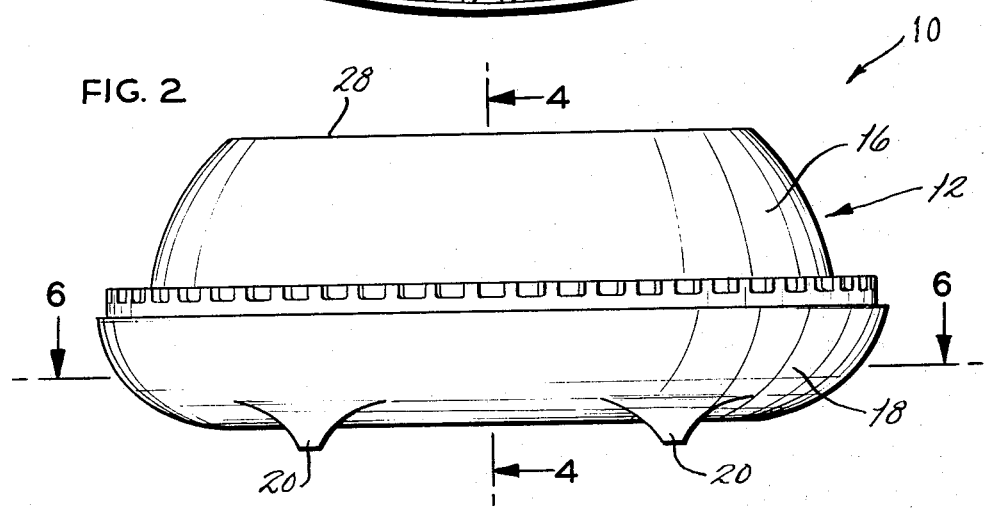
FIG. 2 is a front elevation thereof.

Referring to the drawings for a detailed description of the present invention, a floral accessory incorporating one embodiment thereof is generally indicated by reference number 10. Floral accessory 10 comprises a hollow container 12 having a filler material 14 disposed therein. Container 12 includes an elongated dome 16 supported by a saucer-like base 18 having stub-like supporting legs 20 formed as an integral part thereof. Dome 16 and base 18 are formed of any suitable frangible, lightweight, water-tight material such as polystyrene plastic foam sold under various tradenames, one of which is Dylite. Base 18 includes an elongated recessed floor 22 having an upwardly protruding marginal ledge 24 formed at the periphery thereof. Ledge 24 includes a substantially flat ledge surface 26, the plane of which can be parallel to floor 22. Dome 16, which is generally elliptical in shape, includes an elliptical opening 28 opposite base 18, which opening is defined by a border 29. Dome 16 further includes an annular wall 30 rising from ledge surface 26 in a gently sloping curve toward elliptical opening 28. Annular wall 30 is secured to ledge surface 26 in any suitable manner such as with any known waterproof bonding adhesive that is compatible with polystyrene plastic foam.

Filler 14 comprises a crushable water absorbent material such as a urea-formaldehyde resin foam, which material is easily pierced by cut flower stems such as those generally indicated by reference number 32. Filler 14 is supported on recessed floor 22 of base 18. Lobe-like abutting portions 34 are formed at the periphery of filler 14 to bear against marginal ledge 24, thereby locating filler 14 in a predetermined position with respect to container 12. Abutting portions 34 preferably should not extend above ledge surface 26. Filler 14 further includes a feeder surface 36 having borders 37 extending across elliptical opening 28 beyond border 29 thereof.

Figure 5:
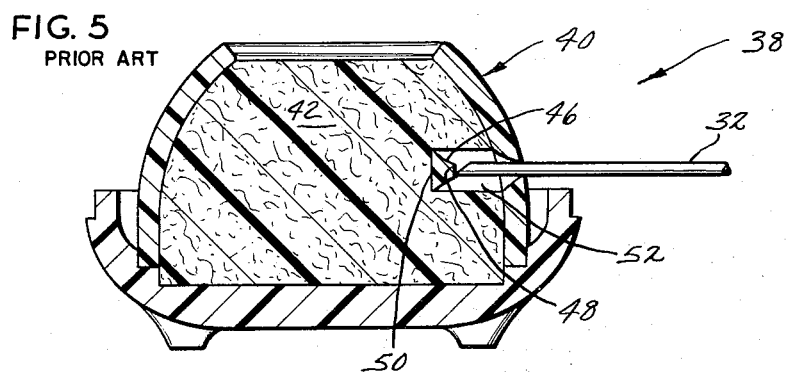
FIG. 5 is a sectional view similar to that shown in FIG. 4 of a floral accessory having no spacing between the filler and container wall.
Figure 6:
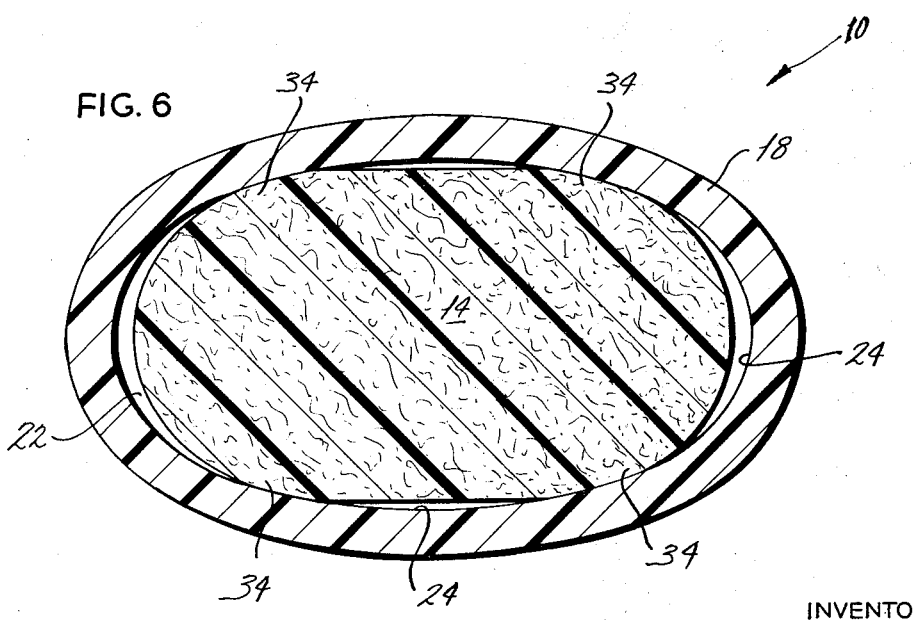
FIG. 6 is a sectional view taken along the line 6—6 of FIG. 2.

FIG. 5 illustrates a floral accessory 38 in cross-section comprising a container 40 similar in shape to container 12 and a filler material 42 filling substantially the entire capacity of container 40. Under this arrangement a flower stem 32 or a peg (not shown) inserted in container 40 usually causes a plug 46 of container wall material to be dislodged therefrom. I have discovered that stem or peg displaced plugs, such as plug 46, are in the general shape of a truncated cone having a minor base portion 48 adjacent the penetrating end of stem 32 and an oppositely disposed major base portion 50. I have also discovered that the diameter of plug base 50 will usually be substantially greater than the diameter of stem 32, and the same would be true if a peg were substituted for stem 32. Plug 46 remains forward of stem 32 during insertion thereof into filler 42, effectively blunting the end of stem 32 and forming a hole 52 in filler 42. It is thus apparent that plug 46 substantially increases the resistance of filler 42 to insertion of stem 32 and can cause stem 32 to buckle. Moreover as the diameter of plug base 50 is substantially greater than the diameter of stem 32, filler hole 52 will also be of substantially greater diameter than the diameter of stem 32. It can be seen that there is no adequate surface-to-surface engagement of stem 32 with filler 42 to provide a firm bedding support for stem 32, Further, the stem end is blocked by plug 46 from contacting filler 42 and since there is little or no contact of stem 32 with filler 42, stem 32 is in effect hampered from adsorbing water from filler 42.

As mentioned, it is an object of the present invention to provide a novel floral accessory having provision for preventing a plug of container wall material from entering the filler material. To this end filler 14 is provided with curved side walls 54 configured to form a collar-like channel 56 between filler 14 and annular wall 30 of container 12.

An annular spacing between the container walls and filler material similar to collar-like channel 56 can also be attained by forming an elongated recess in the container wall surface that confronts the filler material. The recess would extend around the wall surface of the filler. Any suitable pattern such as a vertical pattern of ridges, ribs or protuberances on the container wall or filler surface, or both surfaces, could also provide suitable spacing therebetween. A vertical or inclined arrangement of ribs leading to the base would insure that any water draining from the filler into the channel would be guided by the ribs for flowage to the lowermost levels of the channel. Other methods of providing a space in the accessory such as forming various recessed patterns in either or both confronting surfaces of the filler and container are also feasible.

In use, floral accessory 10 is filled with a predetermined amount of water through opening 28 onto feeder surface 36 of filler 14. The water is readily absorbed and retained by filler 14 with any excess drainage accommodated by channel 56. Flower stem 32 is inserted into container 12, thereby dislodging a plug 70 of container wall material, which plug is similar to previously described plug 46. Plug 70 drops into channel 56 or in some instances remains hinged to wall 30, whereupon insertion of stem 32 into filler 14 merely pivots plug 70 away from the stem. Stem 32 thus freely enters filler 14 unobstructed by plug 70. In this manner stem 32 forms a snug-fitting hole in filler 14, being firmly held in surface-to-surface contact therewith for direct adsorption of water from filler to stem. Flower stems can also be inserted into filler 14 through opening 28 of container 12.

Figure 3:
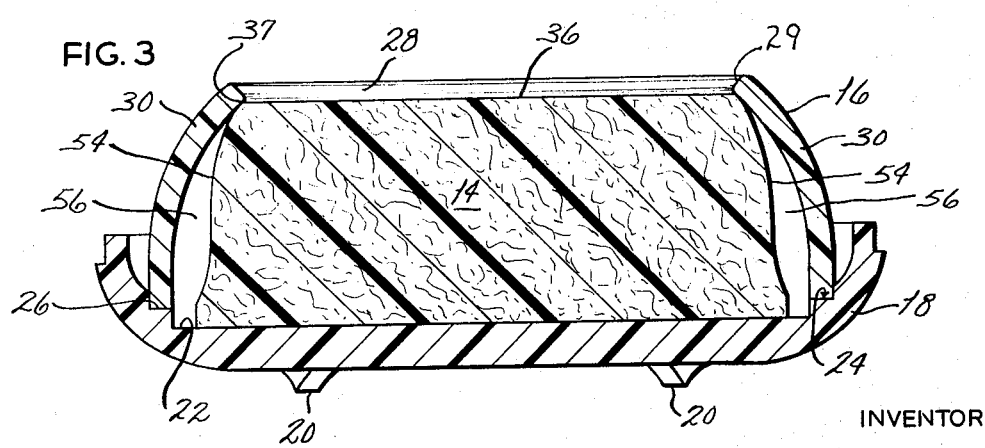
FIG. 3 is a sectional view thereof taken on the line 3—3 of FIG. 1.
Figure 4:
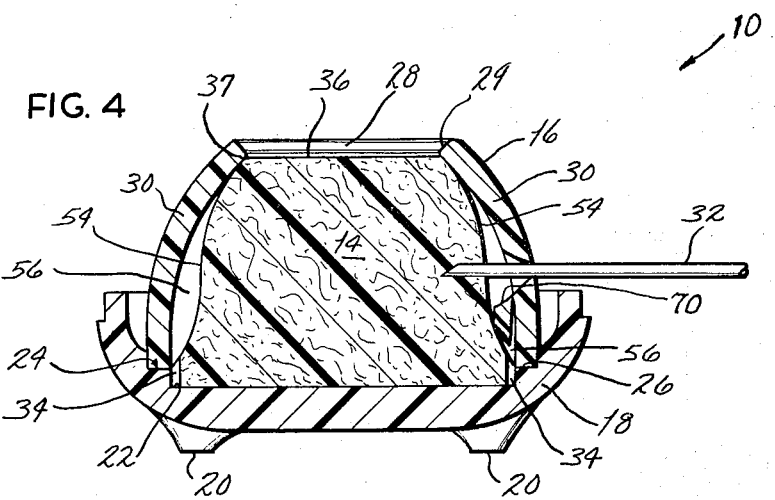
FIG. 4 is a sectional view thereof taken on the line 4—4 of FIG. 2.

In making floral accessory 10, dome 16 and base 18 can be molded using any known methods for molding plastic foam. The cross-sectional profile of curved side wall portion 54 of filler 14, as seen in FIGS. 3 and 4, is formed by using a routing tool (not shown) of complementary size and shape with side walls 54. The filler material can be obtained in generally square or rectangular stock sizes and shapes and the routing tool is arranged to follow an elliptical path around the sides and ends of the stock material to machine the desired profile therein.

As an alternative to the routing process a suitable foam filler material can, if feasible, be molded or cast into the desired shape. Filler 14 is then disposed on base 18 in a predetermined position located by the bearing engagement of lobe-like portions 34 against marginal ledge 24. Dome 16 is adhered to ledge surface 26 and if desired the bottom surface of filler 14 can also be adhesively secured to base 18. Preferably peripheral edge 37 of feeder surface 36 should abut annular wall 30 of dome 16 slightly beyond border 29 of opening 28. This abutment helps to secure filler 14 in its predetermined position and can also serve to seal channel 56 from the air.

It will be apparent to those skilled in the art that the presently disclosed floral accessory is essentially portable and can be supported on a horizontal surface or hung on an inclined or vertical surface by providing known holding means to secure base 18 to the desired supporting surface. It will be further apparent that channel 56 which holds water that may drain from filler 14 can also serve as a reservoir for replenishing water in filler 14 as it is transpired by flowers and foliage. It will also be apparent that other floral accessory shapes can be utilized without departing from the spirit of this invention.

Some advantages of the noval floral accessory that are evident from the foregoing description include a floral display which provides firm flower stem support at both the container wall and the filler. Other advantages include a container and filler type floral accessory wherein a flower stem can be inserted unobstructedly into the filler. Consequently the disclosed problems of flower stem water adsorption, flower stem buckling, cambium layer damage and loosely supported stems have been dealt with and solved.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A flower holder comprising a container made of a frangible, substantially rigid multicellular closed cell material, said container having walls capable of being pierced by the stems of cut flowers such that each said stem displaces a plug of container material from the container wall and said flowers are supported in the pierced portion of the container wall, said flower holder further comprising a filler having at least one piece formed of predetermined shape in the container forming a bed for additional support of said flower stems inserted in the container wall, said filler being capable of being pierced by the stems of cut flowers and being adapted to absorb and hold water for supplying moisture to the inserted stems, said filler and said container being configured to define a generally vertical spaced portion therebetween, said spaced portion being of a greater dimension than said plugs such that said plugs can fall under force of gravity in said spaced portion away from said flower stems and away from the pierced portion of said filler during insertion of the flower stems through the container wall across said spaced portion and into said filler.

2. A flower holder as claimed in claim 1 wherein said filler is secured within said container in a predetermined position such that said filler is spaced from said container wall.

3. A flower holder as claimed in claim 1 wherein said filler includes a peripheral wall surface confronting the container wall, the spaced portion between said container wall and filler being a collar-like channel extending around the peripheral wall surface of said filler.

4. A flower holder as claimed in claim 3 wherein said channel comprises a peripheral annular recess provided in said filler.

5. A flower holder as claimed in claim 3 wherein said filler material is spaced from said container wall, said spacing defining said channel.

6. A flower holder as claimed in claim 1 wherein said filler includes a peripheral wall having protruding portions extending therefrom in abutting engagement with said container wall, such that the position of said filler is fixed within said container.

7. A flower holder as claimed in claim 1 wherein said container has an internal base surface and said filler includes a bottom surface supported by said base surface, said base surface and said bottom surface being attached together such that the position of said filler is fixed within said container.

8. A flower holder as claimed in claim 1 wherein said filler includes a peripheral wall surface confronting said container wall and protuberances on said filler wall, spacing said container wall surface from said filler to define said spaced portion between said filler and said container.

9. A flower holder comprising a container made of a frangible, substantially rigid multicellular closed cell material, said container having walls capable of being pierced by the stems of cut flowers such that each said stem displaced a plug of container material from the container wall and said flowers are supported in the pierced portion of the container wall, said flower holder further comprising a filler having at least one piece formed of predetermined shape in the container forming a bed for additional support of said flower stems inserted in the container wall, said filler being capable of being pierced by the stems of cut flowers and being adapted to absorb and hold water for supplying moisture to the inserted stems, said filler and said container being configured to define a generally vertical spaced portion therebetween, said spaced portion being of a dimension that permits said plugs to pivot in said spaced portion away from said flower stems and away from the pierced portion of said filler during insertion of the flower stems through the container wall across said spaced portion and into said filler.

* * * * *